United States Patent
Ohara

(10) Patent No.: US 11,201,987 B2
(45) Date of Patent: Dec. 14, 2021

(54) IMAGE PROCESSING METHOD, IMAGE PROCESSING DEVICE, AND RECORDING DEVICE

(71) Applicant: SEIKO EPSON CORPORATION, Tokyo (JP)

(72) Inventor: Eiichi Ohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/215,334

(22) Filed: Mar. 29, 2021

(65) Prior Publication Data

US 2021/0306526 A1  Sep. 30, 2021

(30) Foreign Application Priority Data

Mar. 31, 2020  (JP) .............................. JP2020-062457

(51) Int. Cl.
*H04N 1/60* (2006.01)
*B41J 2/21* (2006.01)

(52) U.S. Cl.
CPC ............ *H04N 1/605* (2013.01); *B41J 2/2132* (2013.01); *H04N 1/6019* (2013.01); *H04N 1/6075* (2013.01)

(58) Field of Classification Search
CPC .... H04N 1/605; H04N 1/6019; H04N 1/6075; B41J 2/2132
See application file for complete search history.

(56) References Cited

U.S. PATENT DOCUMENTS

2012/0200627 A1* 8/2012 Arazaki ................... B41J 2/155
                                                          347/15
2018/0213125 A1   7/2018 Takeuchi et al.

FOREIGN PATENT DOCUMENTS

JP   2018-118382 A   8/2018

* cited by examiner

*Primary Examiner* — Christopher Wait
(74) *Attorney, Agent, or Firm* — Global IP Counselors, LLP

(57) ABSTRACT

An image processing method includes a first conversion step, a second conversion step that, using a second conversion table for converting input image data represented by a second color space to output image data represented by the second color space, converts image data of a second region for which recording conditions are different from a first region in a second image data, and a recording data generating step that generates recording data based on third image data including image data of a first region in the second image data and image data of the second region after conversion using the second conversion table. When adjusting an ink amount, the ink amount is not adjusted in the second conversion step and is adjusted in the first conversion step.

8 Claims, 8 Drawing Sheets

IMAGE PROCESSING METHOD, IMAGE PROCESSING DEVICE, AND RECORDING DEVICE

The present application is based on, and claims priority from JP Application Serial Number 2020-062457, filed Mar. 31, 2020, the disclosure of which is hereby incorporated by reference herein in its entirety.

BACKGROUND

1. Technical Field

The present invention relates to an image processing method, an image processing device, and a recording device.

2. Related Art

A printer is known that records an image on a recording medium by alternately repeating scanning, in a main scanning direction, of a recording head capable of discharging ink, and transporting the recording medium in a transport direction that intersects the main scanning direction. Such a printer can perform recording such that a gap is not generated between partial images recorded in each of scans, by causing the partial image recorded by one scan and the partial image recorded by the next scan to overlap. The manner in which the overlapping regions of the partial images are recorded is referred to as an overlap method. In the following, overlap will be abbreviated as OL.

In an image, a number of scans for the recording differs between the overlapping region recorded using the OL method, and a normal region other than the overlapping region, and, as a result of such differences in recording conditions, color unevenness occurs easily in a recording result of the image.

In order to resolve such color unevenness, an image processing method is disclosed, (see JP-A-2018-118382) that includes a first conversion step in which image data corresponding to the normal region in an RGB color space is converted to CMYK data using a normal region lookup table (LUT), a second conversion step in which image data corresponding to a joint region in the RGB color space is converted to CMYK data using a joint region lookup table (LUT), and a print data generation step in which print data is generated on the basis of the CMYK data of the normal region and the joint region.

Here, depending on user requirements, recording characteristics of the individual printer, and the like, it may be necessary to adjust the CMYK data that specifies an amount of ink. In such a case, when the LUT for the color conversion of the image data of the normal region and the LUT for the color conversion of the image data of the joint region, namely, the overlapping region, are respectively adjusted, a ratio and balance between output values of each of the LUTs may be lost, and it may not be possible to suppress the color unevenness between the two regions in the recording result based on the CMYK data by each of the LUTs.

Further, a relationship between regions in which the color unevenness is likely to occur in the recording result as a result of the difference in the recording conditions is not limited to the relationship between the normal region and the overlapping region as described above.

SUMMARY

An image processing method for generating recording data for recording of an image by a recording device configured to perform recording on a recording medium using a recording head discharging a plurality of colors of ink includes a first conversion step for converting, using a first conversion table defining a conversion relationship between a first color space and a second color space indicating an ink amount of the plurality of colors, first image data representing the image by the first color space to second image data represented by the second color space, a second conversion step for converting, using a second conversion table for converting input image data represented by the second color space to output image data represented by the second color space, image data of a second region for which recording conditions by the recording device are different from a first region in the second image data, and a recording data generating step for generating the recording data based on third image data including image data of the first region in the second image data and image data of the second region after the conversion using the second conversion table. When adjusting the ink amount, the ink amount is not adjusted in the second conversion step and is adjusted in the first conversion step.

An image processing device for generating recording data for recording of an image by a recording device configured to perform recording on a recording medium using a recording head discharging a plurality of colors of ink includes a first conversion unit for converting, using a first conversion table defining a conversion relationship between a first color space and a second color space indicating an ink amount of the plurality of colors, first image data representing the image by the first color space to second image data represented by the second color space, a second conversion unit for converting, using a second conversion table for converting input image data represented by the second color space to output image data represented by the second color space, image data of a second region for which recording conditions by the recording device are different from a first region in the second image data, and a recording data generating unit for generating the recording data based on third image data including image data of the first region in the second image data and image data of the second region after the conversion using the second conversion table. When adjusting the ink amount, the second conversion unit does not adjust the ink amount and the first conversion unit adjusts the ink amount.

A recording device configured to record an image on a recording medium by driving, based on recording data, a recording head discharging a plurality of colors of ink, includes a first conversion unit for converting, using a first conversion table defining a conversion relationship between a first color space and a second color space indicating an ink amount of the plurality of colors, first image data representing the image by the first color space to second image data represented by the second color space, a second conversion unit for converting, using a second conversion table for converting input image data represented by the second color space to output image data represented by the second color space, image data of a second region for which recording conditions by the recording device are different from a first region in the second image data, and a recording data generating unit for generating the recording data based on third image data including image data of the first region in the second image data and image data of the second region after the conversion using the second conversion table. When adjusting the ink amount, the second conversion unit does not adjust the ink amount and the first conversion unit adjusts the ink amount.

DESCRIPTION OF EXEMPLARY EMBODIMENTS

An embodiment of the present disclosure will be described below with reference to the accompanying drawings. Note that each of the drawings is merely illustrative for describing the embodiment. Because each of the drawings is illustrative, proportions and shapes may not be precise, may not match each other, or some may be omitted.

1. GENERAL DESCRIPTION OF DEVICE

Figure 1:
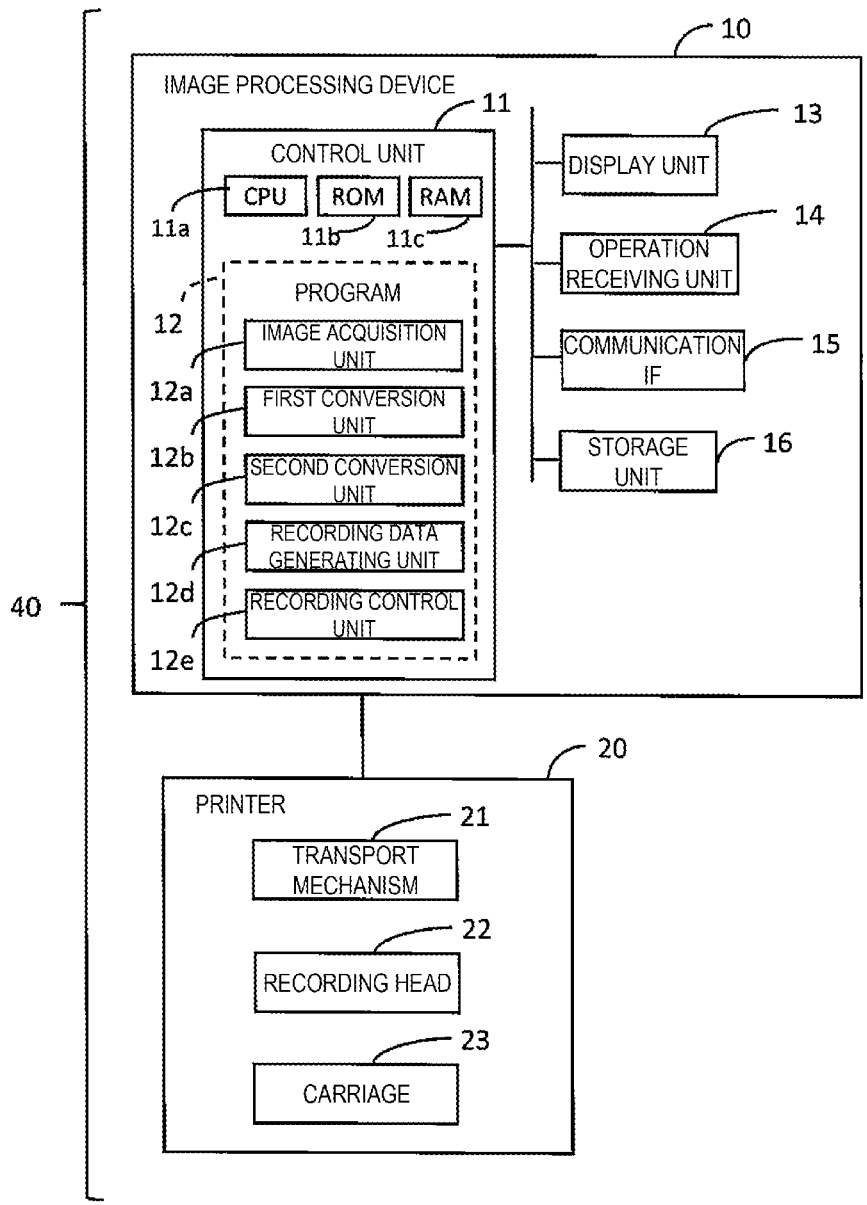
FIG. 1 is a block diagram schematically illustrating a device configuration.

FIG. 1 schematically illustrates a configuration of a system 40 according to the embodiment. The system 40 includes an image processing device 10 and a printer 20. The system 40 may be referred to as a recording system, an image processing system, a printing system, or the like. An image processing method is realized by at least a part of the system 40.

The image processing device 10 is realized, for example, by a personal computer, a server, a smartphone, a tablet terminal, or an information processing device having a similar degree of processing capability as the above-mentioned devices. The image processing device 10 includes a control unit 11, a display unit 13, an operation receiving unit 14, a communication interface 15, a storage unit 16, and the like. Interface is abbreviated as IF. The control unit 11 is configured to include one or more ICs each including a CPU 11a as a processor, a ROM 11b, a RAM 11c, and the like, another non-volatile memory, and the like.

In the control unit 11, the processor, namely, the CPU 11a executes arithmetic processing in accordance with programs stored in the ROM 11b, the other memory, or the like, using the RAM 11c or the like as a work area. By executing processing in accordance with a program 12, the control unit 11 functions in concert with the program 12, and realizes a plurality of functions, such as an image acquisition unit 12a, a first conversion unit 12b, a second conversion unit 12c, a recording data generating unit 12d, and a recording control unit 12e. Note that the processor is not limited to a single CPU, and may be a plurality of the CPUs, may be configured to perform processing by a hardware circuit such as an ASIC, or may be configured such that the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by the user, and is realized, for example, by a physical button, a touch panel, a mouse, a keyboard, or the like. Of course, the touch panel may be realized as a function of the display unit 13. The display unit 13 and the operation receiving unit 14 can be referred to as an operating panel of the image processing device 10.

The display unit 13 and the operation receiving unit 14 may be a part of the configuration of the image processing device 10, or may be peripheral devices external to the image processing device 10. The communication IF 15 is a generic term for one or more of IFs used by the image processing device 10 to perform wired or wireless communication with the outside in accordance with a prescribed communication protocol including a known communication standard. For example, the control unit 11 communicates with the printer 20 via the communication IF 15. The storage unit 16 is realized by a non-volatile memory, an HDD, or another storage device. The storage unit 16 may be understood to be a part of the control unit 11, and the RAM 11c may be understood to be a part of the storage unit 16, for example.

The printer 20, which is a recording device controlled by the image processing device 10, is an inkjet printer that discharges a liquid such as ink and performs recording. A droplet of liquid discharged by the printer 20 is referred to as a dot. Although a detailed description of the inkjet printer is omitted, the printer 20 is mainly provided with a transport mechanism 21, a recording head 22, and a carriage 23.

The transport mechanism 21 is provided with a roller that transports the recording medium, a motor for driving the roller, and the like, and transports the recording medium in a predetermined transport direction.

Figure 2:
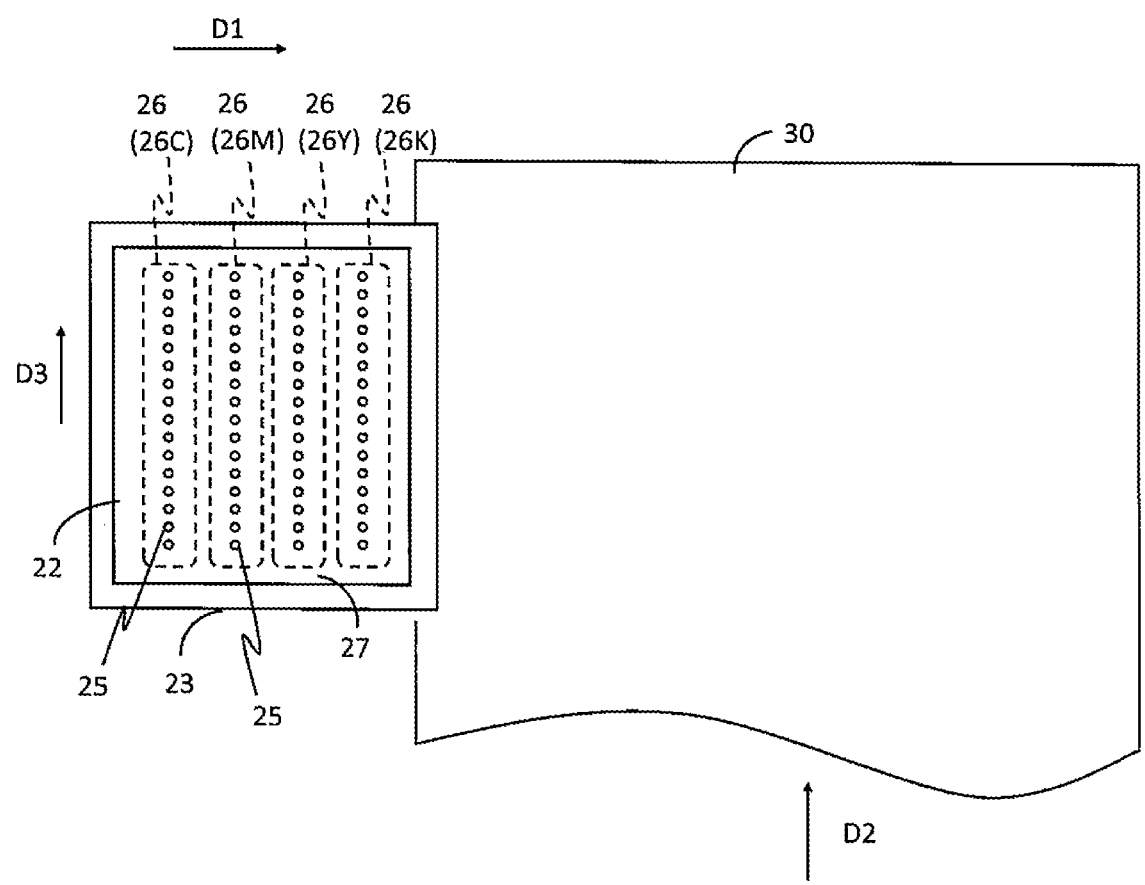
FIG. 2 is a diagram schematically illustrating a relationship between a recording medium and a recording head, as viewed from above.

As illustrated in FIG. 2, the recording head 22 is provided with a plurality of nozzles 25 capable of discharging dots, and the dots are discharged from each of the nozzles 25 onto a recording medium 30 transported by the transport mechanism 21. The printer 20 discharges and does not discharge the dot from the nozzle 25 by controlling application of a drive signal to a driving element (not illustrated) provided in the nozzle 25, in accordance with the recording data described below. The printer 20 discharges ink of a plurality of colors such as cyan (C), magenta (M), yellow (Y), and black (K), or ink of other colors to perform the recording.

FIG. 2 schematically illustrates a relationship between the recording head 22 and the recording medium 30, as viewed from above. The recording head 22 may be referred to as a print head, a printing head, a liquid discharging head, and the like. The recording medium 30 is typically a sheet of paper, but may be a medium other than paper as long as it is a medium on which the recording can be performed by the discharge of the liquid.

The recording head 22 is mounted on the carriage 23 that is reciprocally movable along a first direction D1, and moves together with the carriage 23. The carriage 23 is movable in the first direction D1 and in the reverse direction to the first direction D1, by a carriage motor (not illustrated). Movement of the carriage 23 in the first direction D1 is referred to as a "forward movement", and the movement in the reverse direction to the first direction D1 is referred to as a "return movement". The direction D1 and the reverse direction to the first direction D1 are also referred to as the main scanning direction.

The transport mechanism 21 transports the recording medium 30 in a second direction D2 that intersects the first direction D1. The second direction D2 is the transport direction. Upstream and downstream in terms of transport are referred to simply as upstream and downstream. The intersection between the first direction D1 and the second direction D2 may be understood to be orthogonal. However, due to various differences in the printer 20 as a product, the first direction D1 and the second direction D2 may not be exactly orthogonal to each other.

A reference sign 27 denotes a nozzle surface 27 in which the nozzles 25 in the recording head 22 are open. FIG. 2 illustrates an example of an arrangement of the nozzles 25 in the nozzle surface 27. Each of small circles in the nozzle surface 27 is the nozzle 25. The recording head 22 is provided with a plurality of nozzle rows 26 in a configuration in which ink of each of the CMYK colors is supplied from a liquid holding unit (not illustrated), which is referred to as an ink cartridge, an ink tank, or the like installed in the printer 20, and is discharged from the nozzles 25. The nozzle row 26 formed by the nozzles 25 configured to discharge a C ink is also described as a nozzle row 26C. Similarly, the nozzle row 26 formed by the nozzles 25 that discharge an M ink is also described as a nozzle row 26M, the nozzle row 26 formed by the nozzles 25 that discharge a Y ink is also described as a nozzle row 26Y, and the nozzle row 26 formed by the nozzles 25 that discharge a K ink is also described as a nozzle row 26K. The nozzle rows 26C, 26M, 26Y, and 26K are aligned along the first direction D1.

Each of the nozzle rows 26 is configured by the plurality of nozzles 25 for which a nozzle pitch, which is an interval between the nozzles 25 in the second direction D2, is constant, or is substantially constant. The direction in which the plurality of nozzles 25 configuring the nozzle row 26 are aligned is referred to as a nozzle row direction D3. In the example in FIG. 2, the nozzle row direction D3 is parallel with the second direction D2 that is the transport direction. In the configuration in which the nozzle row direction D3 is parallel with the second direction D2, the nozzle row direction D3 and the first direction D1 are orthogonal to each other. However, the nozzle row direction D3 need not necessarily be parallel with the second direction D2, and may be configured to obliquely intersect the first direction D1. In either case, the plurality of nozzles 25 configuring the nozzle row 26 can be said to be aligned in the second direction D2 because the nozzle pitch in the second direction D2 is constant or substantially constant. Positions of the nozzle rows 26C, 26M, 26Y, and 26K in the second direction D2 are aligned with each other.

According to the example in FIG. 2, the printer 20 is a so-called serial type printer, and records the image on the recording medium 30 by alternately repeating transport, by a predetermined transport amount (hereinafter, a feed amount) of the recording medium 30 in the second direction D2, and ink discharge by the recording head 22 along with the movement of the carriage 23 along the first direction D1. The operation of the recording head 22 discharging ink along with the forward movement and the return movement of the carriage 23 is referred to as "scanning" or a "pass".

The control unit 11 controls the printer 20 so that a plurality of "raster lines" extending in the first direction D1 and arranged in the second direction D2 are recorded on the recording medium 30.

The image processing device 10 and the printer 20 may be connected through a network (not illustrated). In addition to the printing function, the printer 20 may be a multifunction machine that combines a plurality of functions, such as a scanner function, a facsimile communication function, or the like. The image processing device 10 may not only be realized independently by a single information processing device, but may also be realized by a plurality of information processing devices communicatively connected to each other via a network.

Alternatively, the image processing device 10 and the printer 20 may be a recording device in which the image processing device 10 and the printer 20 are integrally provided. In other words, the system 40 may be the single recording device 40 including the recording control unit 10 and the printer 20 as an embodiment. Thus, the processing executed by the image processing device 10 described below may be understood to be processing performed by the recording device 40.

2. DESCRIPTION OF IMAGE PROCESSING METHOD

Figure 3:
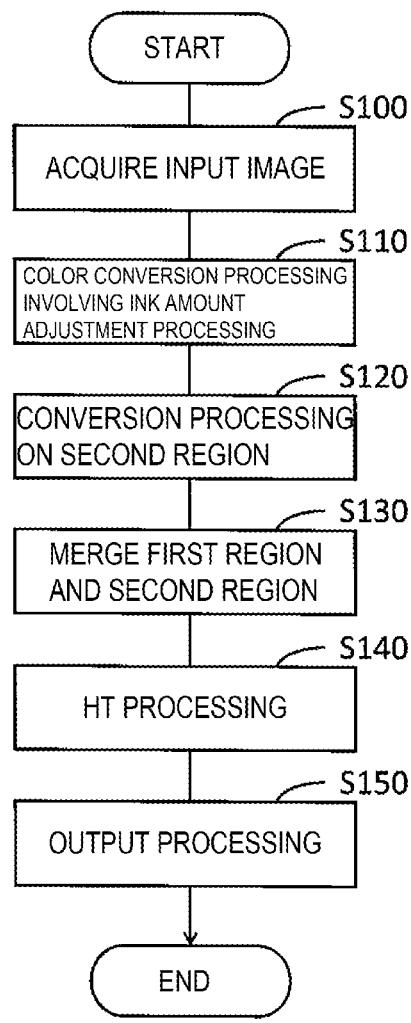
FIG. 3 is a flowchart illustrating recording control processing.

FIG. 3 illustrates, using a flowchart, recording control processing executed by the control unit 11 in accordance with the program 12. This recording control processing realizes the image processing method of the embodiment. The control unit 11 starts the recording control processing when a recording command for an input image is received.

At step S100, the image acquisition unit 12a acquires the input image. The user freely selects the input image, for example, by operating the operation receiving unit 14 while viewing a UI screen displayed on the display unit 13 to issue the recording command for the input image. UI is an abbreviation for user interface. The image acquisition unit 12a acquires the input image selected in this manner, from a storage source such as a predetermined memory.

The input image acquired at step S100 is image data in a bitmap format representing an image, such as characters, a photograph, artwork, or the like, using a predetermined first color space. The first color space is a color space that is different from a second color space described below, and is, for example, an RGB (red, green, blue) color space. In this case, the input image includes RGB values that are a combination of RGB gray scale values for each of pixels. The gray scale value is expressed, for example, using a 256 gray scale range for each of the colors from 0 to 255. Image data representing the input image corresponds to "first image data". The image acquisition unit 12a may perform resolution conversion processing, as necessary, in order to match respective vertical and horizontal recording resolutions of the input image to each of vertical and horizontal recording resolutions by the printer 20.

At step S110, the first conversion unit 12b performs color conversion processing on the input image. In other words, the input image is converted to image data represented by the second color space indicating ink amounts of the plurality of colors used in the recording by the printer 20. As described above, when the printer 20 is a model that uses the CMYK inks, and the image data of the input image includes the RGB values for each of the pixels, the first conversion unit 12b converts the RGB values for each of the pixels of the image data to CMYK values, which are combinations of gray scale values for each of CMYK. The CMYK values are ink amounts of each of CMYK. Step S110 corresponds to a first conversion step.

Figure 4:
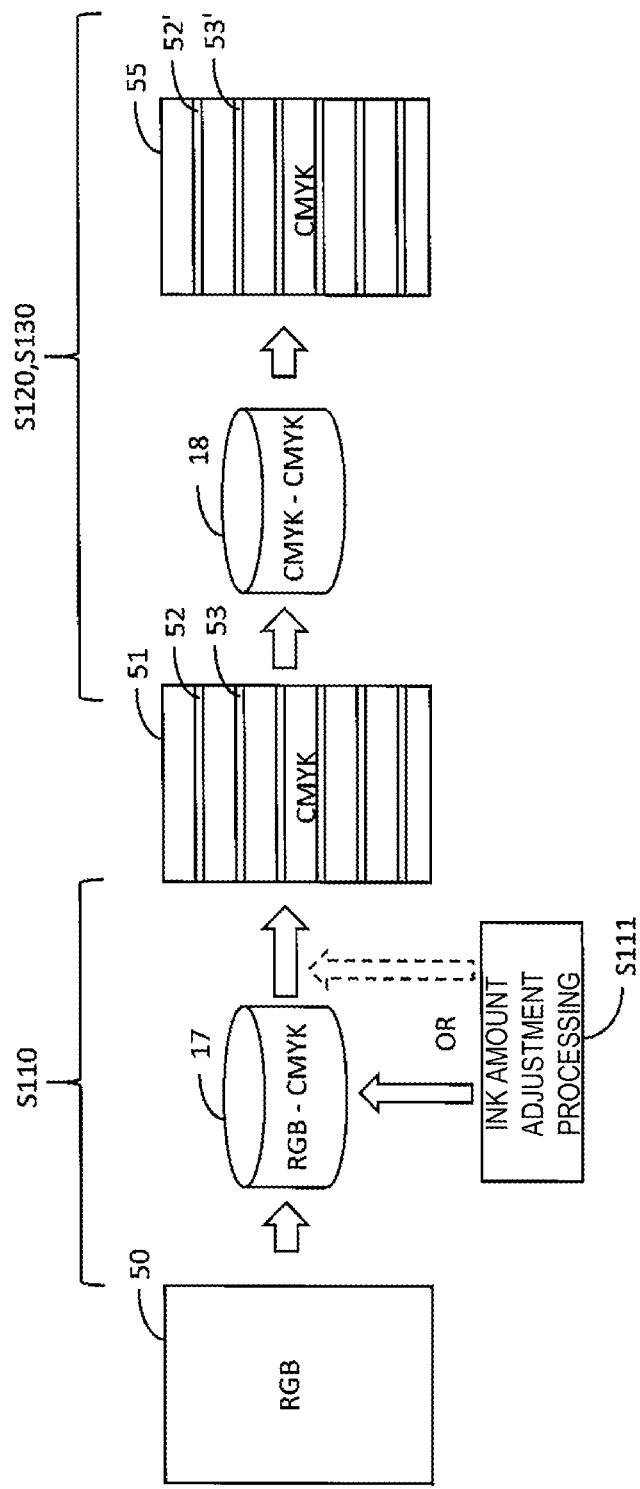
FIG. 4 is a diagram schematically illustrating a flow of processing from step S110 to step S130.

FIG. 4 schematically illustrates a flow of processing of step S110 to step S130. A reference sign 50 is image data 50 of the input image. At step S110, the first conversion unit 12b refers to a color conversion LUT 17 and performs color conversion processing on the image data 50. The color conversion LUT 17 is stored in advance in the storage unit 16. The color conversion LUT 17 is a table defining correspondence relationships with the CMYK values for the plurality of RGB values, and corresponds to a "first conversion table" defining a conversion relationship between the first color space and the second color space. In this case, the CMYK color space corresponds to the second color space. The first conversion unit 12*b* may refer to the color conversion LUT 17, and use an interpolation operation or the like as appropriate to color convert each of pixels configuring the image data 50. As a result of step S110, the image data 50 is converted to image data 51 in which each of the pixels has a CMYK value. The image data 51 corresponds to "second image data".

In the embodiment, the color conversion processing at step S110 involves ink amount adjustment processing (step S111). In other words, step S111 is a part of step S110.

The ink amount adjustment processing is, for example, color adjustment for changing the hue. By operating the operation receiving unit 14 while viewing the UI screen, for example, the user can input, along with the recording command described above, a color adjustment command that causes the image as a whole to have a stronger reddish color, or a stronger blueish color. Thus, at step S111, the first conversion unit 12*b* adjusts the color conversion LUT 17 in accordance with the input color adjustment command. For example, when the color adjustment command to strengthen the red color is received, the first conversion unit 12*b* replaces the CMYK values defined by the color conversion LUT 17 corresponding to (R,G,B)=(10,10,10), with CMYK values defined by the color conversion LUT 17 corresponding to (R,G,B)=(15,10,10). In this way, the color conversion LUT 17 adjusts the CMYK values defined in correspondence with the RGB values to a color that is increased in redness overall.

Further, the ink amount adjustment processing is, for example, a density adjustment for adjusting light and shade. By operating the operation receiving unit 14 while viewing the UI screen, for example, the user can input, along with the recording command described above, a density adjustment command that darkens or lightens the image overall. Thus, at step S111, the first conversion unit 12*b* adjusts the color conversion LUT 17 in accordance with the input density adjustment command. For example, when the image is subjected to the density adjustment command that darkens the image, the first conversion unit 12*b* uniformly sets, to 1.1 times, the gray scale values of each of CMYK defined in correspondence with each of the RGB values in the color conversion LUT 17.

Further, the ink amount adjustment processing, for example, is an adjustment of each color of ink in accordance with discharge variations of each color of ink in the recording head 22. Inherent variations exist in the recording head 22 for each manufactured unit. For example, there are variations such as the ink discharge amount by the nozzle row 26C that discharges the C ink is less than the ink discharge amount by the other nozzle rows 26M, 26Y, and 26K, the ink discharge amount by the nozzle row 26K that discharges the K ink is greater than the ink discharge amount by the other nozzle rows 26C, 26M, and 26Y, and the like. Information about such discharge variations for each of the ink colors is stored in the memory (not illustrated) provided in the printer 20.

Thus, at step S111, the first conversion unit 12*b* acquires the information about the discharge variations for each of the ink colors from the printer 20, and adjusts the color conversion LUT 17 in accordance with the information. When the ink discharge amount by the nozzle row 26C is less than the ink discharge amount by the other nozzle rows 26M, 26Y, and 26K, as in the example described above, of the gray scale values of each of CMYK defined in correspondence with each of the RGB values in the color conversion LUT 17, the first conversion unit 12*b* uniformly increases the gray scale value of C in accordance with the variation information. Further, when the ink discharge amount by the nozzle row 26K is greater than the ink discharge amount by the nozzle rows 26C, 26M, and 26Y, as in the example described above, of the gray scale values of each of CMYK defined in correspondence with each of the RGB values in the color conversion LUT 17, the first conversion unit 12*b* uniformly reduces the gray scale value of K in accordance with the variation information.

Of course, at step S111, the first conversion unit 12*b* can perform a plurality of types of ink amount adjustment processing, as described above.

At step S110, the first conversion unit 12*b* performs the color conversion processing on the image data 50 with reference to the color conversion LUT 17 that has been subjected to the ink amount adjustment processing as illustrated in FIG. 4.

Alternatively, at step S110, the first conversion unit 12*b* may perform the color conversion processing on the image data 50 with reference to the color conversion LUT 17 that has not been subjected to the ink amount adjustment processing, and may perform the ink amount adjustment processing with respect to the CMYK values obtained for each of the pixels of the image data using the color conversion processing, as illustrated by dashed lines in FIG. 4.

In either case, the color conversion processing at step S110 that includes the ink amount adjustment processing generates the image data 51 including the CMYK values for each of the pixels to which the ink amount adjustment processing has been applied.

At step S120, of a "first region", and a "second region" for which the recording conditions by the recording device are different from the first region, in the second image data, the second conversion unit 12*c* converts the image data of the second region, using a "second conversion table" that converts the input image data represented by the second color space to output image data represented by the second color space. Step S120 corresponds to a second conversion step.

Here, with respect to the recording control processing illustrated in FIG. 3, the description is continued assuming that the control unit 11 causes the printer 20 to perform partial OL recording to record, using the OL method, the overlapping region that is the partial region of the image. The overlapping region corresponds to the second region.

Before describing the details of step S120, an overview of the partial OL recording will be described.

Figure 5:
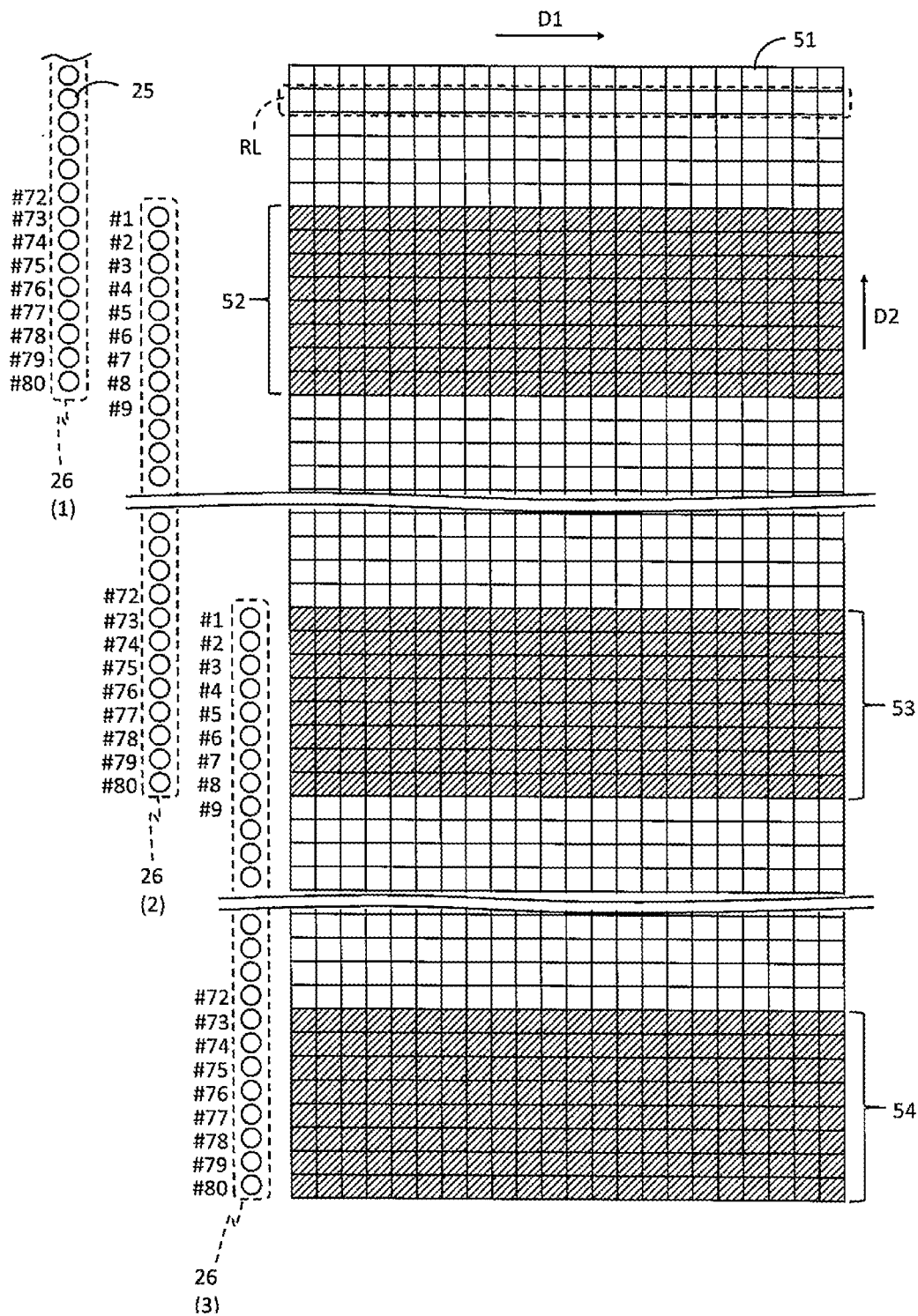
FIG. 5 is a diagram illustrating an allocation relationship of nozzles and pixels.

FIG. 5 illustrates a correspondence relationship between the nozzles 25 and the pixels in an allocation for performing the partial OL recording. FIG. 5 illustrates a portion of the image data 51 that is the second image data. Each rectangle configuring the image data 51 is each of the pixels of the image data 51. In FIG. 5, correspondence relationships between the image data 51 and the directions D1 and D2 are also illustrated. A reference sign RL denotes a single pixel row or one raster line in which a plurality of the pixels are arranged in the first direction D1.

FIG. 5 illustrates the nozzle row 26 including the plurality of nozzles 25 configured to discharge one color of the ink. In FIG. 5, the nozzle row 26 is configured by eighty of the nozzles 25 arranged in the second direction D2. In FIG. 5, for reference, a nozzle number from #1 to #80 is allocated to each of the eighty nozzles 25 configuring the nozzle row 26, in order from downstream to upstream. Of course, the configuration in which the number of nozzles in the nozzle row 26 is eighty is merely an example. As described above, the recording head 22 includes the plurality of nozzle rows 26 corresponding to each of the plurality of inks. The positional relationship between the nozzle row 26 corresponding to the one color ink and the image data 51 described in FIG. 5 is common to each of the nozzle rows 26.

All of the nozzle rows 26 illustrated in FIG. 5 are the same nozzle row 26. In other words, in FIG. 5, the relative positional relationship between the nozzle row 26 and the image data 51 in the second direction D2 varies for each pass of the recording head 22. In FIG. 5, numbers such as 1, 2, 3 . . . , indicated by parentheses along with the reference sign 26, represent a sequential number of the pass of the nozzle row 26. In FIG. 5, the nozzle row 26 appears to be moving upstream each time the number of passes increases. In actuality, the transport mechanism 21 transports the recording medium 30 downstream between the passes by the feed amount, so that the positional relationship between the nozzle row 26 and the image data 51 for each pass as illustrated in FIG. 5 is reproduced as a recording result on the recording medium 30. In FIG. 5, the nozzle row 26 in each pass is illustrated as being shifted in the first direction D1, but this is for ease of illustration and does not mean that there is a difference in position in the first direction D1 of the nozzle row 26 per pass.

In the example in FIG. 5, the feed amount by the transport mechanism 21 between the passes is a distance 72 times the nozzle pitch. In this way, each of raster lines RL recorded by each of the upstream nozzles 25 having the nozzle numbers #73 to #80, of the nozzle row 26 in a given pass, can be recorded using each of the downstream nozzles 25 having the nozzle numbers #1 to #8, of the nozzle row 26 in the next pass. In other words, each of the nozzles 25 having the nozzle numbers #1 to #8 and each of the nozzles 25 having the nozzle numbers #73 to #80 have a positional relationship capable of recording the common raster line RL, and realize the recording of the OL method. As illustrated in FIG. 5, for example, the raster line RL recorded by the nozzle 25 having the nozzle number #73 in the given pass can be recorded by the nozzle 25 having the nozzle number #1 in the next pass.

In FIG. 5, hatched regions 52, 53, and 54 of the image data 51 are specific examples of the overlapping regions, and regions in the image data 51 that do not correspond to such overlapping regions are the normal regions. The normal region corresponds to the first region. Each of the raster lines RL forming the overlapping region area is recorded using the OL method. According to the OL method, when paying attention to the recording of one raster line with one color of ink, the raster line is recorded by a plurality of the nozzles 25 that discharge the one color of ink. When the printer 20 is the serial printer, one of the raster lines RL in the overlapping region is recorded in a plurality of passes, and one of the raster lines RL in the normal region is recorded in a single pass. The hatching in the image data 51 is noted for convenience in distinguishing the overlapping regions 52, 53, and 54 from the normal regions, and does not relate at all to the ink amount per pixel of the image data 51.

The second conversion unit 12c recognizes, in advance, the correspondence relationship between the nozzle 25 and the pixels for performing this type of the partial OL recording, and at step S120, identifies the normal regions and the overlapping regions of the image data 51 based on this correspondence relationship. In the image data 51 in FIG. 4, the plurality of overlapping regions 52, 53 . . . are exemplified by a plurality of elongated rectangles. At step S120, the second conversion unit 12c converts only the image data in the overlapping regions in the image data 51 with reference to the ink amount conversion LUT 18. The ink amount conversion LUT 18 is stored in advance in the storage unit 16 and corresponds to the second conversion table.

The ink amount conversion LUT 18 is a table defining a conversion relationship for the ink amount in order to eliminate color unevenness between the first region and the second region in the recording result.

As described above, since the number of passes required for recording is different between the normal region and the overlapping region, density differences easily occur between both regions in the recording result. Specifically, in the recording of the overlapping region, a drying time is sometimes secured for the dots recorded in a preceding pass, between the preceding pass and a subsequent pass for recording, or a number of dots discharged onto the recording medium in one pass is sometimes less than that in the normal region. As a result of such differences in the recording conditions, even when a picture of the same content in terms of the normal region and the overlapping region is reproduced on the recording medium, a difference in density occurs between the normal region and the overlapping region in the recording result. Therefore, for example, when there is a tendency for the overlapping region to have a darker color than the normal region in the recording result, the ink amount conversion LUT 18 is a table that outputs the input CMYK values after the conversion to reduce the gray scale values thereof.

A degree of the density difference between the normal region and the overlapping region occurring in the recording result varies depending on the type of the recording medium 30 and the environment such as the temperature and humidity. Thus, the storage unit 16 may store a plurality of the ink amount conversion LUTs 18 for eliminating color unevenness between the normal region and the overlapping region in accordance with the type of the recording medium 30 and the environment. Then, at step S120, the second conversion unit 12c may select and use the optimal ink amount conversion LUT 18 for the current conditions from the storage unit 16 in accordance with information about the type of the recording medium 30 set in the printer 20 and information about the temperature and humidity obtained by a temperature and humidity sensor (not illustrated).

The second conversion unit 12c inputs the CMYK value into the ink amount conversion LUT 18 for each pixel included in the overlapping region in the image data 51, and acquires the CMYK value as the output value after the conversion using the ink amount conversion LUT 18. The conversion from the CMYK value to the CMYK value with reference to the ink amount conversion LUT 18 may be performed using an interpolation operation and the like as appropriate.

At step S130, the second conversion unit 12c merges the image data of the first region in the second image data with the image data of the second region after the conversion by the conversion processing at step S120, to generate "third image data". In other words, the image data of the normal region in the image data 51 and the image data of the overlapping region after the conversion using the ink amount conversion LUT 18 are combined together to generate the third image data. Image data 55 illustrated in FIG. 4 is the third image data. In the image data 55, overlapping regions 52', 53' . . . after the overlapping regions 52, 53 . . . in the image data 51 are converted using the ink amount conversion LUT 18 are illustrated. Data of the regions in the image data 55 other than the overlapping regions remains the same as in the image data 51.

At step S140, the recording data generation unit 12d performs halftone processing on the image data 55 generated at step S130. Halftone is abbreviated as HT. A specific technique of the HT processing is not particularly limited, and dithering, an error diffusion method, or the like can be employed. As a result of the HT processing, the image data is in a state of including information for discharge of the dot (dot on) or non-discharge of the dot (dot off) of each of the CMYK inks for each pixel. Image data following the HT processing is referred to as recording data. Of course, the dot on information in the recording data may be information defining which is to be discharged of a plurality of types of dots having different sizes, such as large dots, medium dots, and small dots, for example. Step S140 corresponds to a recording data generation step to generate the recording data on the basis of the third image data.

At step 3150, the recording control unit 12e performs output processing in which the image data is transferred to the printer 20 after the recording control unit 12e rearranges the recording data to be transferred to the printer 20 in accordance with the correspondence relationship between the nozzles 25 and the pixels in order to perform the partial OL recording described above. This rearrangement processing is also referred to as rasterization processing. In the rasterization processing, of the raster lines configuring the recording data, the recording control unit 12e allocates each of the pixels configuring each of the raster lines configuring the overlapping region so as to be distributed over a plurality of passes. Of the plurality of passes for recording the raster lines configuring the overlapping region, the preceding pass is referred to as a preceding pass, and the subsequent pass is referred to as a subsequent pass. As a result of the rasterization processing, it is confirmed which of the dots of the ink defined by the recording data are discharged by which of the nozzles 25 at what timing of which pass, in accordance with a pixel position and color of the dot. The recording control unit 12e transmits, to the printer 20, the recording data after the rasterization processing, and a feed amount command. The printer 20 drives the transport mechanism 21, the recording head 22, and the carriage 23 on the basis of the recording data transmitted from the image processing device 10, the feed amount command, and the like, so as to record an image represented by the recording data on the recording medium 30.

A supplemental description of the processing at step S150 will be made with reference to FIG. 5. Note that the image data 51 illustrated in FIG. 5 is the image data after the color conversion processing at step S110, but the correspondence relationship between the pixels and the nozzles 25 is the same for the image data 51 as for the recording data generated from the image data 55 at step S140. Thus, in the supplemental description of step S150 with reference to FIG. 5, the image data 51 is treated as the recording data for convenience.

In FIG. 5, a nozzle range of the nozzle numbers #1 to #8 is referred to as a "downstream OL nozzle range", and a nozzle range of the nozzle numbers #73 to #80 is referred to as an "upstream OL nozzle range". For each of the raster lines RL configuring the overlapping region 52, the recording control unit 12e allocates the pixels to each of the nozzles 25 in the upstream OL nozzle range in the nozzle row 26 in a first pass, and allocates the pixels to each of the nozzles 25 in the downstream OL nozzle range in the nozzle row 26 in a second pass. For example, for the raster line RL furthest downstream in the overlapping region 52, some of the pixels configuring this raster line RL are allocated to the nozzle 25 having the nozzle number #73 in the first pass, and the remaining pixels configuring this raster line RL are allocated to the nozzle 25 having the nozzle number #1 in the second pass. There are various methods for allocating each of the pixels configuring the raster line to the preceding pass and the subsequent pass. For example, in one of the raster lines included in the overlapping region, the recording control unit 12e may allocate each of the pixels arranged in the first direction D1 to the nozzle 25 of the preceding pass and the nozzle 25 of the subsequent pass for recording this raster line one at a time in an alternating manner.

Similarly, according to FIG. 5, for each of the raster lines RL configuring the overlapping region 53, the recording control unit 12e allocates the pixels to each of the nozzles 25 in the upstream OL nozzle range in the nozzle row 26 in the second pass and each of the nozzles 25 in the downstream OL nozzle range in the nozzle row 26 in a third pass. Similarly, for each of the raster lines RL configuring the overlapping region 54, the recording control unit 12e allocates the pixels to each of the nozzles 25 in the upstream OL nozzle range in the nozzle row 26 in the third pass and each of the nozzles 25 in the downstream OL nozzle range in the nozzle row 26 in a fourth pass. In FIG. 5, the nozzle row 26 of the fourth and subsequent passes is not illustrated due to limitations on paper.

For each of the raster lines RL configuring the normal region of the recording data, the recording control unit 12e allocates all of the pixels in the raster line RL to the one corresponding nozzle 25, in order to record the one raster line RL in one pass. According to FIG. 5, for the raster line RL positioned downstream of and adjacent to the overlapping region 52, for example, the recording control unit 12e allocates all of the pixels configuring this raster line RL to the nozzle 25 having the nozzle number #72 in the first pass. Further, for example, for the raster line RL positioned downstream of and adjacent to the overlapping region 53, the recording control unit 12e allocates all of the pixels configuring this raster line RL to the nozzle 25 having the nozzle number #72 in the second pass. As a result of step S150 including such allocation processing, of the recording data, each of the raster lines RL in the overlapping region is recorded on the recording medium 30 using the OL method, and each of the raster lines RL in the normal region is recorded on the recording medium 30 in one pass.

3. CONCLUSION

According to the embodiment, the image processing method is disclosed in which the recording device, which is capable of recording on the recording medium 30 using the recording head 22 configured to discharge the plurality of colors of ink, generates the recording data for recording the image. The image processing method includes the first conversion step that, using the first conversion table defining the conversion relationship between the first color space and the second color space indicating the ink amount of the plurality of colors, converts the first image data representing the image by the first color space to the second image data represented by the second color space. The image processing method includes the second conversion step that, using the second conversion table for converting the input image data represented by the second color space to the output image data represented by the second color space, converts the image data of the second region for which the recording conditions are different from the first region in the second image data. The image processing method includes the recording data generating step that generates the recording data based on the third image data including the image data of the first region in the second image data and the image data of the second region after the conversion using the second conversion table. Then, according to the image processing method, when the ink amount is adjusted, the ink amount is not adjusted in the second conversion step and is adjusted in the first conversion step.

According to the above-described configuration, in the first conversion step, the color conversion processing from the first image data to the second image data that involves the ink amount adjustment processing required with respect to the image is performed regardless of whether it is the first region or the second region. Further, as a result of the second conversion step, the conversion processing relating to the second region of the second image data is performed using the second conversion table. Thus, the necessary ink amount adjustment for the image is reflected, and the recording result can be obtained in which the color unevenness between the first region and the second region is also appropriately suppressed. In other words, according to the embodiment, when the ink amount adjustment is performed with respect to each of the color conversion LUTs that take into account the characteristics of each of the regions, that is the color conversion LUT suited to the color conversion processing of the first region and the color conversion LUT suited to the color conversion processing of the second region, defects can be resolved such as a loss of a ratio or balance between output values of each of the LUTs, which further causes a situation in which the color unevenness between the two regions cannot be suppressed.

Further, according to the embodiment, the ink amount adjustment includes at least one of the color adjustment for changing the hue, the density adjustment for adjusting the light and shade, and the adjustment of each of the colors of ink in accordance with the discharge variations of each of the colors of ink in the recording head 22.

According to the above-described configuration, the ink amount adjustment corresponding to the user's wishes or to characteristics unique to the recording head 22 is reflected, and the recording result can be obtained in which the color unevenness between the first region and the second region is also appropriately suppressed.

In the embodiment, a color gamut of the input image data that can be converted by the second conversion table is wider than a color gamut after the conversion using the first conversion table.

The ink amount conversion LUT 18, which is the second conversion table, is the table in which the CMYK values that are the output values are associated with each of the plurality of CMYK values that are a plurality of input lattice points in the CMYK color space that is the second color space. Thus, the color gamut of the input image data that can be converted by the second conversion table is a color reproduction range (hereinafter referred to as a second color reproduction range) based on the plurality of CMYK values that are the plurality of input lattice points of the ink amount conversion LUT 18. On the other hand, the color conversion LUT 17, which is the first conversion table, is the table in which the CMYK values that are the output values are associated with each of a plurality of input lattice points in the RGB color space that is the first color space. Thus, the color gamut after the conversion using the first conversion table is a color reproduction range (hereinafter referred to as a first color reproduction range) based on the plurality of CMYK values associated with the plurality of input lattice points of the color conversion LUT 17. Further, the first color reproduction range is a color reproduction range by the color conversion LUT 17 obtained after the adjustment by the ink amount adjustment processing. The color reproduction range can be defined in a device-independent color space, for example.

In the embodiment, the first color reproduction range is smaller than the second color reproduction range. With such a configuration, the image data of the second region in the second image data after the color conversion processing at step S110 can be reliably converted using the second conversion table.

Further, according to the embodiment, when the recording device reproduces the image on the recording medium by recording the plurality of partial images, using the recording head 22, based on the recording data, the second region corresponds to the overlapping region of the image in which the partial images overlap with each other, and the first region corresponds to the region of the image excluding the overlapping region.

According to the description above, the partial image is the image region recorded by the single pass, of the image recorded by the plurality of passes of the recording head 22. For example, in FIG. 5, the image region including the overlapping region 52, the overlapping region 53, and the normal region sandwiched by these overlapping regions 52 and 53 is the single partial image.

According to such a configuration, the necessary ink amount adjustment for the image formed by the normal region and the overlapping regions is reflected, and the recording result can be obtained in which the color unevenness between the normal region and the overlapping regions is also appropriately suppressed.

The embodiment discloses various categories of the disclosure, such as devices and programs, in addition to the image processing method.

The image processing device 10, which generates the recording data for the recording of the image by the recording device configured to perform recording on the recording medium 30 using the recording head 22 that discharges the plurality of colors of ink, includes the first conversion unit 12b for converting the first image data representing the image by the first color space to the second image data represented by the second color space, using the first conversion table defining the conversion relationship between the first color space and the second color space, which indicates the ink amount of the plurality of colors. The image processing device 10 includes the second conversion unit 12c for converting the image data of the second region for which recording conditions by the recording device are different from the first region in the second image data, using the second conversion table for converting the input image data represented by the second color space to the output image data represented by the second color space, and the recording data generating unit 12d for generating the recording data based on the third image data including the image data of the first region in the second image data and the image data of the second region after the conversion using the second conversion table. When adjusting the ink amount, the second conversion unit 12c does not adjust the ink amount and the first conversion unit 12b adjusts the ink amount.

Further, the recording device 40, which is configured to record the image on the recording medium 30 by driving, based on the recording data, the recording head 22 that discharges the plurality of colors of ink, includes the first conversion unit 12b that, using the first conversion table defining the conversion relationship between the first color space and the second color space indicating the ink amount of the plurality of colors, converts the first image data representing the image by the first color space to the second image data represented by the second color space. The recording device 40 includes the second conversion unit 12c that, using the second conversion table for converting the input image data represented by the second color space to the output image data represented by the second color space, converts the image data of the second region for which the recording conditions by the recording device are different from the first region in the second image data. The recording device 40 includes the recording data generating unit 12d that generates the recording data based on the third image data including the image data of the first region in the second image data and the image data of the second region after the conversion using the second conversion table. When adjusting the ink amount, the second conversion unit 12c does not adjust the ink amount and the first conversion unit 12b adjusts the ink amount.

4. MODIFIED EXAMPLES

The combination of the first region and the second region for which the recording conditions differ is not limited to the combination of the normal region and the overlapping region configuring the image recorded by the partial OL recording.

First Modified Example

The printer 20 causes the recording head 22 to discharge the ink in each of the movement of the recording head 22 in the first direction D1 and the movement of the recording head 22 in the reverse direction from the first direction D1, and transports the recording medium 30 in the second direction D2 that intersects the first direction D1. In such a configuration, of the image, the first region may be a region, as a recording target, in which the recording is initiated by the movement of the recording head 22 in the first direction D1, and, of the image, the second region may be a region in which the recording is initiated by the movement of the recording head 22 in the reverse direction.

Figure 6:
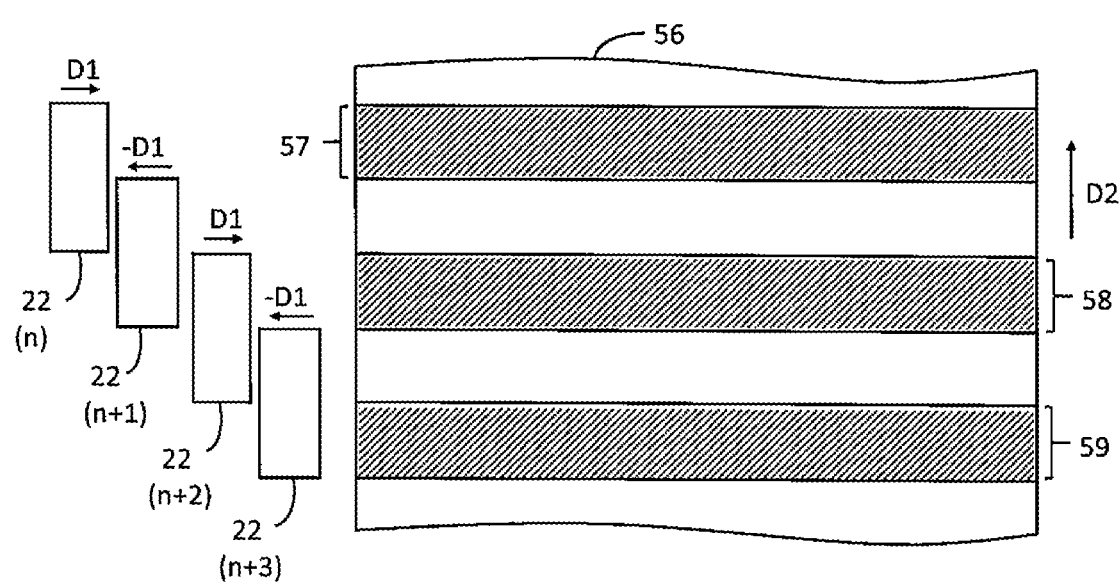
FIG. 6 is a diagram describing a first region and a second region in a first modified example.

FIG. 6 is a diagram describing the first region and the second region in the first modified example. FIG. 6 illustrates a state in which the relative positional relationship between the recording head 22 and image data 56 changes in the second direction D2 in each pass of the recording head 22. FIG. 6 may be generally understood in the same manner as the relative positional changes in the second direction D2 between the nozzle row 26 and the image data 51 illustrated in FIG. 5. However, FIG. 6 is considerably simplified compared to FIG. 5, and the recording head 22 including the nozzle row 26 is represented simply as a rectangle. The image data 56 may be understood to be a type of the second image data generated at step S110.

In FIG. 6, the recording head 22 indicated by the arrow oriented toward the right along with the reference sign D1 is the recording head 22 that moves in the first direction D1, that is, performs the forward movement. Further, the recording head 22 indicated by the arrow oriented toward the left along with the reference sign −D1 is the recording head 22 that moves in the reverse direction from the direction D1, that is, performs the return movement. In FIG. 6, "n" and "n+1", indicated in parentheses along with the reference sign 22 represent the corresponding number of the passes to record the image data 56.

While FIG. 5 illustrates the specific example of the partial OL recording, FIG. 6 is a diagram describing full OL recording. The full OL recording refers to recording all the raster lines forming one page of the image using the OL method. Specifically, according to FIG. 6, the feed amount between the passes of the recording head 22 is approximately half the length of the nozzle row 26 in the second direction D2. Further, each of long regions in the first direction D1 partitioned in the image data 56 is referred to as a band region, and the one band region is recorded by a pass by one forward movement of the recording head 22 and a pass by one return movement of the recording head 22.

For example, a band region 57 of the image data 56 is recorded using the OL method by the return movement of the recording head 22, which is the n−1-th pass, and the forward movement of the recording head 22, which is the n-th pass. Note that in FIG. 6, the recording head 22 is not illustrated at a position corresponding to the n−1-th pass. The band region upstream of and adjacent to the band region 57 is recorded by the forward movement of the recording head 22, which is the n-th pass, and the return movement of the recording head 22, which is the n+1-th pass. Similarly, a band region 58 is recorded by the return movement of the recording head 22, which is the n+1-th pass, and the forward movement of the recording head 22, which is the n+2-th pass. The band region upstream of and adjacent to the band region 58 is recorded by the forward movement of the recording head 22, which is the n+2-th pass, and the return movement of the recording head 22, which is the n+3-th pass. A band region 59 is recorded by the return movement of the recording head 22, which is the n+3-th pass, and the forward movement of the recording head 22, which is the n+4-th pass. In FIG. 6, the recording head 22 is not illustrated at a position corresponding to the n+4-th pass.

In other words, according to FIG. 6, the hatched band regions 57, 58, and 59 in the image data 56 are the second regions in which the recording is initiated by the return movement of the recording head 22, and the band regions other than the band regions 57, 58, and 59 in the image data 56 are the first region in which the recording is initiated by the forward movement of the recording head 22. The difference in density is likely to occur in the recording result between the first region in which the recording is initiated by the forward movement of the recording head 22 and the second region in which the recording is initiated by the return movement of the recording head 22. One reason for the difference in density is a difference in the order of ink overlap in the recording medium 30. With reference to the example of the nozzle rows 26 in FIG. 2, the first region recorded in the order of the forward movement followed by the return movement is recorded on the recording medium 30 by discharging the inks in the order K, Y, M, C, C, M, Y, and K. On the other hand, the second region recorded in the order of the return movement followed by the forward movement is recorded on the recording medium 30 by discharging the inks in the order C, M, Y, K, K, Y, M, and C. When the order of the ink overlap is different in this way, the difference in density or the color unevenness occurs in the recording result between the first region and the second region. In addition to the difference in the order of the ink overlap, the difference in density easily occurs in the recording result due to a difference in pressure generated in an ink flow path in the recording head 22, or a difference in an airflow generated between the carriage 23 and the recording medium 30 between the forward movement and the return movement.

In light of such circumstances, in the first modified example, the region of the image in which the recording is initiated by the forward movement of the recording head 22 is treated as the first region, the region in which the recording is initiated by the return movement of the recording head 22 is treated as the second region, and the recording control processing illustrated in FIG. 3 is executed. As a result, the necessary adjustment of the ink amount for the image is reflected, and the color unevenness between the first region and the second region can also be appropriately suppressed.

Note that the region in which the recording is initiated by the forward movement of the recording head 22 and the region in which the recording is initiated by the return movement of the recording head 22 may each be a region that is recorded in a single pass only, or each may be a region that is rerecorded in three or more passes.

Second Modified Example

When the printer 20 repeatedly discharges the ink in accordance with the movement of the recording head 22 in the first direction D1, and discharges the ink in accordance with the movement of the recording head 22 in the direction opposite to the direction D1 to perform the recording of a unit region in the image, the positions of the first region and the second region in the unit region may be different in the first direction D1.

Figure 7:
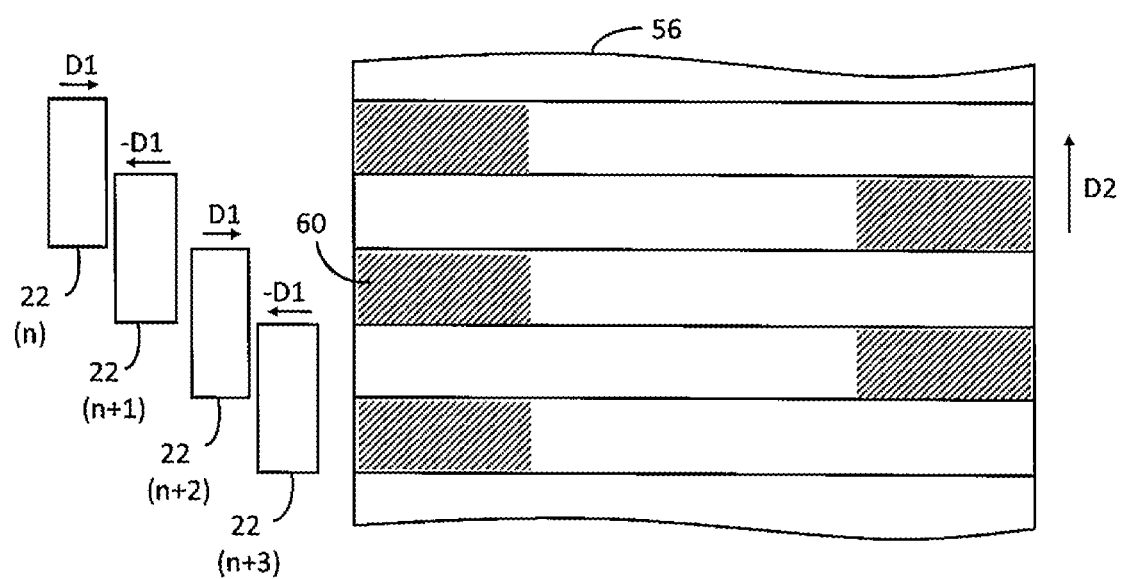
FIG. 7 is a diagram describing the first region and the second region in a second modified example.

FIG. 7 is a diagram describing the first region and the second region in the second modified example. FIG. 7 is substantially the same diagram as FIG. 6, with only the first and second regions being different from those illustrated FIG. 6. In FIG. 7, the hatched regions in each of the band regions are the second regions and all other regions are the first regions. The unit region in the second modified example is the band region. In the band region, the positions of the first region and the second region are different in the first direction D1. In the second modified example, the second region is a region for which a time difference between the preceding pass and the subsequent pass is shorter than a given reference. For example, a second region 60 indicated by a reference sign 60 is recorded by the return movement of the recording head 22, which is the n+1-th pass, and then is recorded by the forward movement of the recording head 22, which is the n+2-th pass. When the time difference between the preceding pass and the subsequent pass is short, the drying time of the dots discharged in the preceding pass is barely secured, and when compared to a region in which the time difference between the preceding pass and the subsequent pass is long, the difference in density occurs in the recording result.

In light of such circumstances, in the second modified example, in the unit region recorded, using the OL method, by the pass of the forward movement and the pass of the return movement, the positions of the first region and the second region are different in the first direction D1, and the recording control processing illustrated in FIG. 3 is executed. As a result, the necessary adjustment of the ink amount for the image is reflected, and the color unevenness between the first region and the second region can also be appropriately suppressed.

Note that in the second modified example, in each of the unit regions, the region for which the time difference between the preceding pass and the subsequent pass is longer than the reference may be the second region. Furthermore, in the second modified example, in each of the unit regions, a region for which the time difference between the preceding pass and the subsequent pass is shorter than a first time period may be the second region, a region for which the time difference between the preceding pass and the subsequent pass is longer than a second time period may be a third region, and a region for which the time difference between the preceding pass and the subsequent pass falls within a range from the first time period to the second time period may be the first region. Note that the first time period is shorter than the second time period. With such a configuration, at step S120, each of the image data of the second region and the image data of the third region can be converted using separate conversion tables for eliminating the color unevenness with the first region in the recording result, and then, at step S130, the first region, the second region after the conversion, and the third region after the conversion can be merged.

The printer 20 used in the embodiment may be a so-called line printer, as described below, rather than the serial printer.

Figure 8:
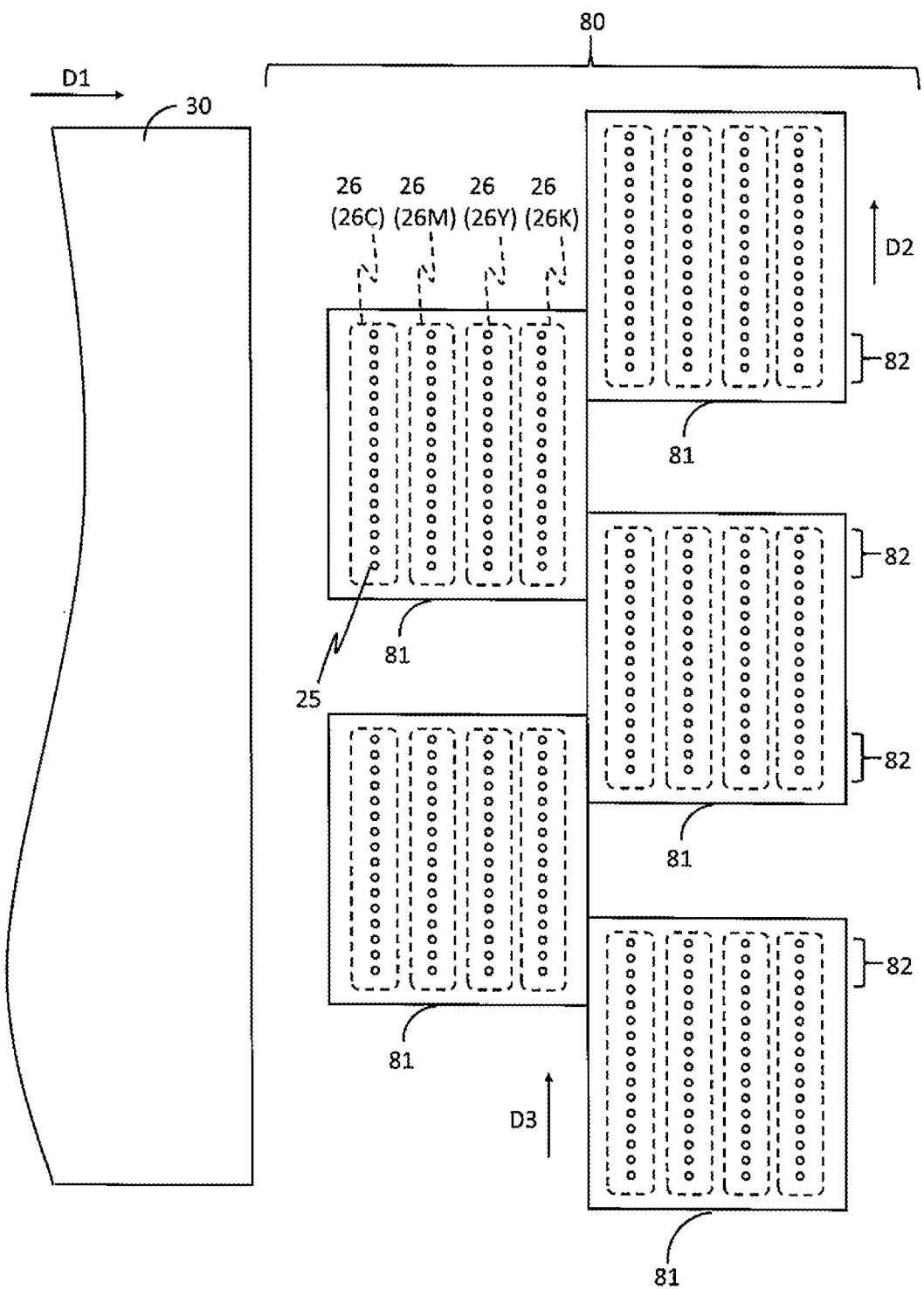
FIG. 8 is a diagram illustrating another example of the relationship between the recording medium and the recording head, as viewed from above.

FIG. 8 schematically illustrates a relationship between a recording head 80 and the recording medium 30 in the printer 20 that is the line printer, as viewed from above. The printer 20 that is the line printer includes the recording head 80 instead of the recording head 22, and does not include the carriage 23.

The relationship of the directions D1, D2, D3 is as previously described. However, when the printer 20 is the line printer, the second direction D2 is not referred to as the transport direction and is referred to as the main scanning direction and the width direction of the recording medium 30. The direction D1 is not referred to as the main scanning direction and is referred to as the transport direction. The transport mechanism 21 transports the recording medium 30 in the first direction D1. The recording head 80 is configured to be long so as to be able to cover the width of the recording medium 30, by coupling a plurality of nozzle chips 81 having the same configuration along the second direction D2, and is disposed at a predetermined position on the transport path of the recording medium 30. Each of the nozzle chips 81 configuring the recording head 80 may be understood to have a configuration similar to that of the recording head 22 illustrated in FIG. 2. The recording head 80 discharges dots from each of the nozzles 25 onto the recording medium 30 transported in the first direction D1.

In other words, the plurality of nozzle chips 81 each including the nozzle rows 26C, 26M, 26Y, and 26 K are coupled in the second direction D2, and thus, the entire recording head 80 is configured to have a length that can cover the width of the recording medium 30 and to include the nozzle row for each of the CMYK inks. According to the configuration illustrated in FIG. 8, the raster line is a line extending in the transport direction. The mutually coupled nozzle chips 81 are coupled so that portions of the nozzle rows mutually overlap in the nozzle row direction D3. In this manner, the recording using the OL method is performed using the nozzles 25 of a nozzle range 82 in which the portions of the nozzle rows overlap between the nozzle chips 81. In other words, a region of the image formed from the raster lines recorded by the nozzles 25 in the nozzle range 82 is the overlapping region, and a region of the image formed from the raster lines recorded by the nozzles 25 other than the nozzle range 82 is the normal region. Further, in the configuration illustrated in FIG. 8, the image region recorded by one of the nozzle chips 81 corresponds to the partial image.

What is claimed is:

1. An image processing method for generating recording data for recording of an image by a recording device configured to perform recording on a recording medium using a recording head discharging a plurality of colors of ink, the method comprising:
- a first conversion step for converting, using a first conversion table defining a conversion relationship between a first color space and a second color space indicating an ink amount of the plurality of colors, first image data representing the image by the first color space to second image data represented by the second color space;
- a second conversion step for converting, using a second conversion table for converting input image data represented by the second color space to output image data represented by the second color space, image data of a second region for which recording conditions by the recording device are different from a first region in the second image data; and
- a recording data generating step for generating the recording data based on third image data including image data of the first region in the second image data and image data of the second region after the conversion using the second conversion table, wherein
- when the ink amount is adjusted, the ink amount is not adjusted in the second conversion step and is adjusted in the first conversion step.

2. The image processing method according to claim 1, wherein
- the adjustment of the ink amount includes at least one of a color adjustment for changing a hue, a density adjustment for adjusting light and shade, and an adjustment of each of the colors of ink in accordance with discharge variations, at the recording head, of each of the colors of ink.

3. The image processing method according to claim 1, wherein
- a color gamut of the input image data convertible by the second conversion table is wider than a color gamut after the conversion using the first conversion table.

4. The image processing method according to claim 1, wherein
- when the recording device reproduces the image on the recording medium by recording a plurality of partial images, using the recording head, based on the recording data,
- the second region corresponds to an overlapping region of the image in which the partial images overlap with each other, and
- the first region corresponds to a region of the image excluding the overlapping region.

5. The image processing method according to claim 1, wherein
- when the recording device causes the recording head to discharge the ink in each of a movement of the recording head in a first direction and a movement of the recording head in a reverse direction from the first direction, and transports the recording medium in a second direction intersecting the first direction,
- the first region is a region of the image where the recording is initiated by the movement of the recording head in the first direction, and
- the second region is a region of the image where the recording is initiated by the movement of the recording head in the reverse direction.

6. The image processing method according to claim 1, wherein
- when the recording device records a unit region in the image by repeating discharge of the ink in accordance with a movement of the recording head in a first direction and discharge of the ink in accordance with a movement of the recording head in a reverse direction from the first direction,
- positions of the first region and the second region in the unit region are different in the first direction.

7. An image processing device for generating recording data for recording of an image by a recording device configured to perform recording on a recording medium using a recording head discharging a plurality of colors of ink, the device comprising:
- a first conversion unit for converting, using a first conversion table defining a conversion relationship between a first color space and a second color space indicating an ink amount of the plurality of colors, first image data representing the image by the first color space to second image data represented by the second color space;
- a second conversion unit for converting, using a second conversion table for converting input image data represented by the second color space to output image data represented by the second color space, image data of a second region for which recording conditions by the recording device are different from a first region in the second image data; and
- a recording data generating unit for generating the recording data based on third image data including image data of the first region in the second image data and image data of the second region after the conversion using the second conversion table, wherein
- when the ink amount is adjusted, the second conversion unit does not adjust the ink amount and the first conversion unit adjusts the ink amount.

8. A recording device configured to record an image on a recording medium by driving, based on recording data, a recording head discharging a plurality of colors of ink, the recording device comprising:
- a first conversion unit for converting, using a first conversion table defining a conversion relationship between a first color space and a second color space indicating an ink amount of the plurality of colors, first image data representing the image by the first color space to second image data represented by the second color space;
- a second conversion unit for converting, using a second conversion table for converting input image data represented by the second color space to output image data represented by the second color space, image data of a second region for which recording conditions by the recording device are different from a first region in the second image data; and
- a recording data generating unit for generating the recording data based on third image data including image data of the first region in the second image data and image data of the second region after the conversion using the second conversion table, wherein
- when the ink amount is adjusted, the second conversion unit does not adjust the ink amount and the first conversion unit adjusts the ink amount.

* * * * *